United States Patent [19]

Ishkin

[11] 4,366,392
[45] Dec. 28, 1982

[54] AERIAL POWER TRANSMISSION LINE WITH LIGHTNING PROTECTION WIRES DESIGNED ALSO TO TRANSMIT RF SIGNALS

[76] Inventor: Vyacheslav K. Ishkin, ulitsa Paustovskogo, 8, korpus 3, kv. 161, Moscow, U.S.S.R.

[21] Appl. No.: 205,443

[22] PCT Filed: Dec. 5, 1979

[86] PCT No.: PCT/SU79/00129
§ 371 Date: Sep. 3, 1980
§ 102(e) Date: Sep. 3, 1980

[87] PCT Pub. No.: WO80/01441
PCT Pub. Date: Jul. 10, 1980

[30] Foreign Application Priority Data

Jan. 4, 1979 [SU]  U.S.S.R. .............................. 2729716

[51] Int. Cl.³ .................... H02G 7/22; H02G 13/00
[52] U.S. Cl. ..................................... 307/147; 174/2; 174/40 R
[58] Field of Search .................. 174/2, 40 R, 45 R; 52/40, 649, 697; 361/107, 117, 119, 132; 307/147

[56] References Cited

FOREIGN PATENT DOCUMENTS

| | | |
|---|---|---|
| 1933813 | 2/1974 | Fed. Rep. of Germany . |
| 1024033 | 1/1953 | France .............................. 174/45 R |
| 54-106848 | 8/1979 | Japan .................................... 174/2 |
| 399030 | 9/1973 | U.S.S.R. . |
| 424267 | 4/1974 | U.S.S.R. . |
| 456371 | 1/1975 | U.S.S.R. . |
| 488352 | 10/1975 | U.S.S.R. . |
| 574808 | 9/1977 | U.S.S.R. .............................. 174/2 |
| 684670 | 9/1979 | U.S.S.R. . |

OTHER PUBLICATIONS

Bourgsdorf, V. V., et al., "Design of the EHV 1150 kV AC Transmission Line", report at the session of CIGRE No. 31-03, published 1976, publishing house CIGRE (Paris, France), 7 pages.

Primary Examiner—Laramie E. Askin

[57] ABSTRACT

An aerial power transmission line comprises phase wires suspended from supports and a lightning protection system designed also to convey information in the form of r-f signals and having at least two wires 4 and 5 spaced a certain distance apart and forming an r-f data transmission channel. The wires 4 and 5 of the lightning protection system are suspended from the supports 3 one under the other in a substantially vertical plane.

3 Claims, 2 Drawing Figures

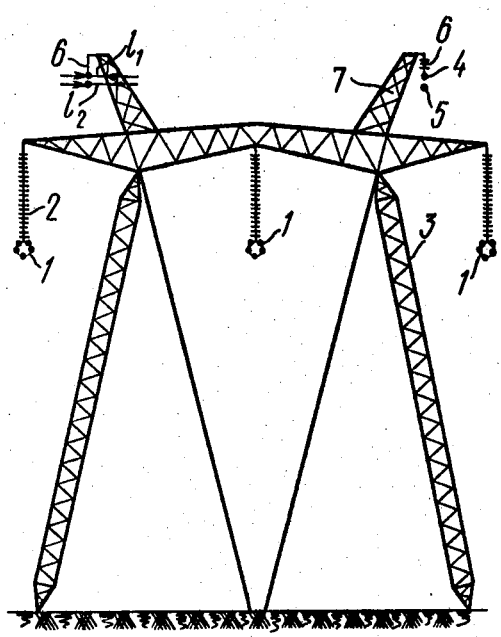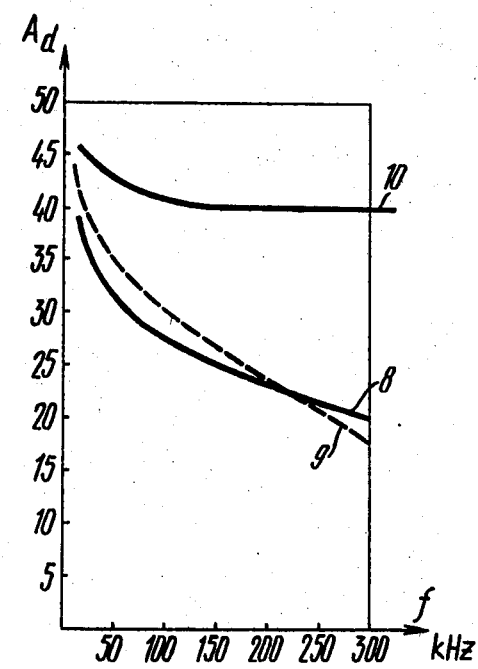
FIG.1
FIG.2

AERIAL POWER TRANSMISSION LINE WITH LIGHTNING PROTECTION WIRES DESIGNED ALSO TO TRANSMIT RF SIGNALS

FIELD OF INVENTION

The present invention relates to means for transmitting electric energy from one location to another and, in particular, to aerial power transmission lines.

Prior Art

Known in the art are aerial power transmission lines comprising phase wires suspended from supports and lightning protection cables secured to said supports and designed also to convey information in the form of r-f signals (cf., for example, USSR Inventors Certificate No. 399,030, published in Discoveries, Inventions, Industrial Designs, Trade Marks, No. 38, Sept. 27, 1973, Bykhovski Ya. L.).

Such aerial power transmission lines, particularly those designed to transmit voltages of the order or 1000 kV and higher, have been generally unsatisfactory due to substantial power losses associated with the corona condition and a high radio-interference level, another disadvantage being the effect of noise level in r-f channels over the lightning protection cables thereof.

Also known in the art are aerial power transmission lines comprising phase wires suspended from supports and a lightning protection system secured to said supports and designed also to convey information in the form of r-f signals. The lightning protection system includes two wires spaced a certain distance apart and forming an r-f channel to convey relevant information. The wires are secured on the supports in a substantially horizontal plane. (cf., for example, USSR Inventor's Certificate No. 456,371 published in Discoveries, Inventions, Industrial Designs, Trade Marks, No. 1, Jan. 5, 1975, Ishkin V. H.).

In the event of single wires forming a cable and suspended from the supports of the power transmission line the total capacitance between said wires and the respective support is about 70 to 80 pF. With two wires suspended from the same support the capacitance between said support and the near wire exceeds by 1.5 to 2 pF the capacitance between said support and the far wire with the wires being spaced some 40 to 60 cm apart and the distance from the support being about 1 m.

Over a length of 1 km the capacitance difference between wires comprised in the lightning protection system varies from 4.5 to 6 pF/km, while the capacitance difference between said wires and phase wires is only from 2 to 2.5 pF/km.

The presence of this capacitance difference between the support and the horizontally disposed wires of the lightning protection system introduces noticeable assymetry into the r-f data transmission channel, a disadvantage causing a high noise level in the r-f channels over the respective cables and substantially increasing the effect of said channels upon the nearby navigational systems, radio reception and so forth.

SUMMARY OF THE INVENTION

The present invention resides in providing an aerial power transmission line having a lower noise level as compared with the prior art by reducing the assymetry introduced by the support into the r-f data transmission channel.

The foregoing object is attained by that in an aerial power transmission line wherein phase wires are suspended from supports and a lightning protection system secured thereto is designed also to convey information in the form of r-f signals and comprises at least one pair of wires suspended from said supports, spaced a certain distance apart and forming an r-f data transmission channel, according to the invention, the wires of the lightning protection system are suspended from the supports one under the other in a substantially vertical plane.

BRIEF DESCRIPTION OF DRAWINGS

The other objects and advantages of the present invention will become apparent from the discussion of a specific embodiment thereof, taken in conjunction with the accompanying drawings, wherein:

FIG. 1 is a length of an aerial power transmission line, according to the invention;

FIG. 2 illustrates frequency versus cross attenuation of a signal in the power transmission line, according to the invention.

PREFERRED EMBODIMENT OF THE INVENTION

Turning initially to FIG. 1, the aerial power transmission line forming the subject of the present invention comprises phase wires 1 (FIG. 1) secured to supports 3 by the use of a string of insulators 2. For simplicity, only a short length of the aerial power transmission line with one support 3 is shown in the drawing.

In addition, the hereinproposed aerial power transmission line includes a lightning protection system designed also to convey information in the form of r-f signals.

The lightning protection system has two pairs of wires 4 and 5 secured to the same support 3 by the use of a string of insulators 6.

In each pair the wires 4 and 5 are spaced a certain distance apart and suspended one under the other in a substantially vertical plane, with the corresponding ground wires of each pair located in respective horizontal planes.

Distances $l_1$ and $l_2$ (FIG. 1) from the wires 4 and 5 to the support 3 are approximately equal since the difference between the two may be neglected with a post 7 of the support 3 inclined at a small angle. Therefore, the capacitances induced between the support 3 and each of the wires 4 and 5 are essentially equal. Consequently, the effect of the support 3 on the r-f channel formed by the wires 4 and 5 will be free from assymmetry. In the preferred embodiment of the invention the noise level in data transmission is appreciably reduced as compared to the prior art.

The substantial effect of the capacitance of the wires 4 and 5 spaced a certain distance apart upon the body of the support 2 is illustrated in FIG. 2. Referring to the drawing, there is shown the relationships between frequency and cross attenuation $A_d$ (dB) in the far end of the power transmission line in the "phase-ground" channel accounted for the effect of the wires on the body of the support for the known lightning protection system with the wires disposed in a substantially horizontal direction with respect to the support (design curve 8 and actual curve 9) and for the hereinproposed lightning protection system (curve 10).

It follows from the above curves that in the preferred embodiment of the invention cross attenuation in the frequency range of up to 300 kHz is some 20 dB less than that in the prior art power transmission lines. Stated differently, the effect of the capacitance on the cross attenuation is practically eliminated with the wires of the lightning protection system being disposed in a substantially vertical direction in compliance with the present invention.

Industrial Applicability

This invention is suitable for simultaneous transmission of electric energy and information in the form of r-f signals via lightning protection system.

I claim:

1. An aerial power transmission line comprising three phase transmission wires suspended from supports and spaced from each other in the horizontal direction and a lightning protection system comprising two pairs of ground wires, said ground wires being insulated from each other and arranged to form an rf channel for conveying information in the form of rf signals, the ground wires of each pair being suspended by a string of insulators from said supports one under the other, one pair of said wires being located above said three phase transmission wires and in a vertical plane between the middle one, and one of the outside phase wires, the other pair of said ground wires being located above the transmission wires in a vertical plane between the middle one and the other of said outside phase wires.

2. The transmission line, according to claim 1, wherein the ground wires of one pair are located in a substantially horizontal plane with correspondingly respective ground wires of the other pair.

3. The transmission line according to claims 1 or 2, wherein the supports include members, each carrying a said pair of wires, each of said wires in each pair being approximately equally spaced apart from a respective said member.

* * * * *